United States Patent [19]

Shtarkman

[11] Patent Number: 4,942,947
[45] Date of Patent: Jul. 24, 1990

[54] ROTARY SHOCK ABSORBER WITH A CONTROLLED DAMPING RATE

[75] Inventor: Emil M. Shtarkman, Southfield, Mich.

[73] Assignee: TRW Inc., Lyndhurst, Ohio

[21] Appl. No.: 339,126

[22] Filed: Apr. 14, 1989

[51] Int. Cl.$^5$ ............................................. F16F 6/00
[52] U.S. Cl. .................................... 188/267; 188/130; 188/290; 267/140.1
[58] Field of Search ....................... 188/130, 267, 290; 267/140.1 E, 140.1 AE

[56] References Cited

U.S. PATENT DOCUMENTS

| | | | |
|---|---|---|---|
| 2,009,676 | 7/1935 | Pennington | 188/130 X |
| 2,247,749 | 7/1941 | de Venel | 188/130 X |
| 2,514,137 | 7/1950 | O'Connor | 188/290 |
| 3,006,656 | 10/1961 | Schaub. | |
| 3,221,849 | 12/1965 | Klass et al. . | |
| 3,255,853 | 6/1966 | Klass et al. . | |
| 3,416,549 | 12/1968 | Chaney et al. . | |
| 4,200,003 | 4/1980 | Miller | 74/574 |
| 4,503,952 | 3/1985 | Hesse | 188/306 |

FOREIGN PATENT DOCUMENTS 0192649  11/1982  Japan .................................. 188/267

Primary Examiner—Duane A. Reger
Attorney, Agent, or Firm—Tarolli, Sundheim & Covell

[57] ABSTRACT

A rotary shock absorber for damping relative movement between parts includes a housing connectable to one of the parts and a shaft having its axially opposite ends connectable with another one of the parts. The housing defines at least one chamber for a field-responsive fluid. The shaft is supported for rotation about its longitudinal central axis relative to the housing. A rotor blade is disposed in the chamber and is connected with the shaft and extends radially of the shaft. The rotor blade is angularly movable in the chamber. A number of energizable electromagnetic coils is provided for, when energized, applying an energy field to the fluid in the chamber. The shear resistance of the fluid varies as a function of the energy field acting on the fluid. When the parts move relative to each other, the shaft rotates about its longitudinal central axis relative to the housing and the rotor blade moves angularly in the chamber. The angular movement of the rotor blade in the chamber is resisted by the fluid. The resistance to movement of the rotor blade in the chamber varies as a function of the shear resistance of the fluid. Thus, the resistance to relative movement of the parts, and hence the damping rate of the rotary shock absorber, varies as a function of the energy field applied to the fluid in the chamber.

14 Claims, 8 Drawing Sheets

4,942,947

ROTARY SHOCK ABSORBER WITH A CONTROLLED DAMPING RATE

BACKGROUND OF THE INVENTION

1. Technical Field

The present invention relates to an apparatus for damping relative movement between parts, and is particularly directed to a rotary shock absorber for use in a vehicle suspension system.

2. Background Art

A multitude of shock absorbers for use in a vehicle suspension system are known. Some shock absorbers include a piston which axially moves within a cylinder. Such a shock absorber may define the minimum height of the vehicle hood or may minimize the passenger compartment size or trunk size. As known for today's automobiles, it is desirable to minimize the height of the vehicle hood for improved aerodynamics and for providing a relatively large trunk and passenger compartment.

Some shock absorbers are of the rotary type in which a rotatable member is angularly movable relative to a nonrotatable member. A known rotary shock absorber for use in a vehicle suspension system is disclosed in U.S. Pat. No. 4,503,952. The rotary shock absorber of U.S. Pat. No. 4,503,952 includes a nonrotatable member and a rotatable member defining a plurality of shear gaps therebetween. Each of the shear gaps contains a viscous fluid dispersion. Upon relative angular movement between the rotatable and nonrotatable members, the resistance to shear of the viscous fluid dispersion in the shear gaps damps movement of the rotatable member relative to the nonrotatable member.

SUMMARY OF THE INVENTION

The present invention is directed to a rotary shock absorber with a controlled damping rate. The rotary shock absorber has a housing defining at least one chamber with a field-responsive fluid in the chamber and in which an angularly movable member is disposed. When the movable member moves in the chamber, the resistance to shear of the fluid in the chamber damps movement of the movable member relative to the housing. When an energy field is applied to the fluid, the shear resistance of the fluid varies. When the shear resistance of the fluid varies, the resistance to movement of the movable member varies. Thus, the resistance to movement of the movable member, and hence the damping rate of the rotary shock absorber, varies as a function of the energy field acting on the fluid.

In accordance with one feature of the present invention, a rotary shock absorber is provided for use in a vehicle. The rotary shock absorber includes a housing connectable with the vehicle frame and defining at least one chamber for a field-responsive fluid. The rotary shock absorber further includes means for applying an energy field to the fluid in the chamber to vary the resistance to shear of the fluid as a function of the energy field acting thereon. A shaft is supported for rotation about its longitudinal central axis relative to the housing and extends in the direction of movement of the vehicle. A rotor blade is disposed in the chamber and is connected with the shaft and extends radially of the shaft. The movement of the rotor blade in the chamber is resisted by the fluid. At least one arm has one end connectable to the shaft and extends radially of the shaft. The other end of the arm is connectable with a vehicle wheel for vertical movement with the vehicle wheel. The shaft rotates about its longitudinal central axis relative to the housing and the rotor blade moves in the chamber as the vehicle wheel moves relative to the vehicle frame. The resistance to movement of the arm varies as a function of the resistance to movement of the rotor blade in the chamber.

In accordance with another feature of the present invention, a rotary shock absorber is provided for damping relative movement between parts. The rotary shock absorber includes a housing connectable to one of the parts and defining at least one chamber for a field-responsive fluid. A shaft has its axially opposite ends connectable to another one of the parts and is supported for rotation about its longitudinal central axis relative to the housing. A rotor blade is disposed in the chamber and is connected with the shaft and extends radially of the shaft. The movement of the rotor blade in the chamber is resisted by the fluid. At least one energizeable, arcuate-shaped electromagnetic coil is connected with the housing for, when energized, applying an energy field to the field-responsive fluid in the chamber to vary the resistance to shear of the fluid as a function of the energy field acting thereon. The shaft rotates about its longitudinal central axis relative to the housing and the rotor blade moves in the chamber as the parts move relative to each other. The resistance to relative movement of the parts varies as a function of the resistance to movement of the rotor blade in the chamber.

In accordance with still another feature of the present invention, an apparatus is provided for damping relative movement between parts. The apparatus includes a housing connectable to one of the parts and defining at least one chamber for a field-responsive fluid. A shaft has its axially opposite ends connectable with another one of the parts and is supported for rotation about its longitudinal central axis relative to the housing. A rotor blade is disposed in the chamber and is connected with the shaft and extends radially of the shaft. The movement of the rotor blade in the chamber is resisted by the fluid. The apparatus further includes yieldable means connected between the housing and axially opposite end portions of the shaft for providing a fluid-tight seal between the housing and the axially opposite end portions of the shaft to prevent leakage of the fluid from the chamber. The yieldable means includes an outer sleeve press-fit into the housing, an inner sleeve press-fit on an end portion of the shaft, and an elastomeric member connected between the inner and outer sleeves.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
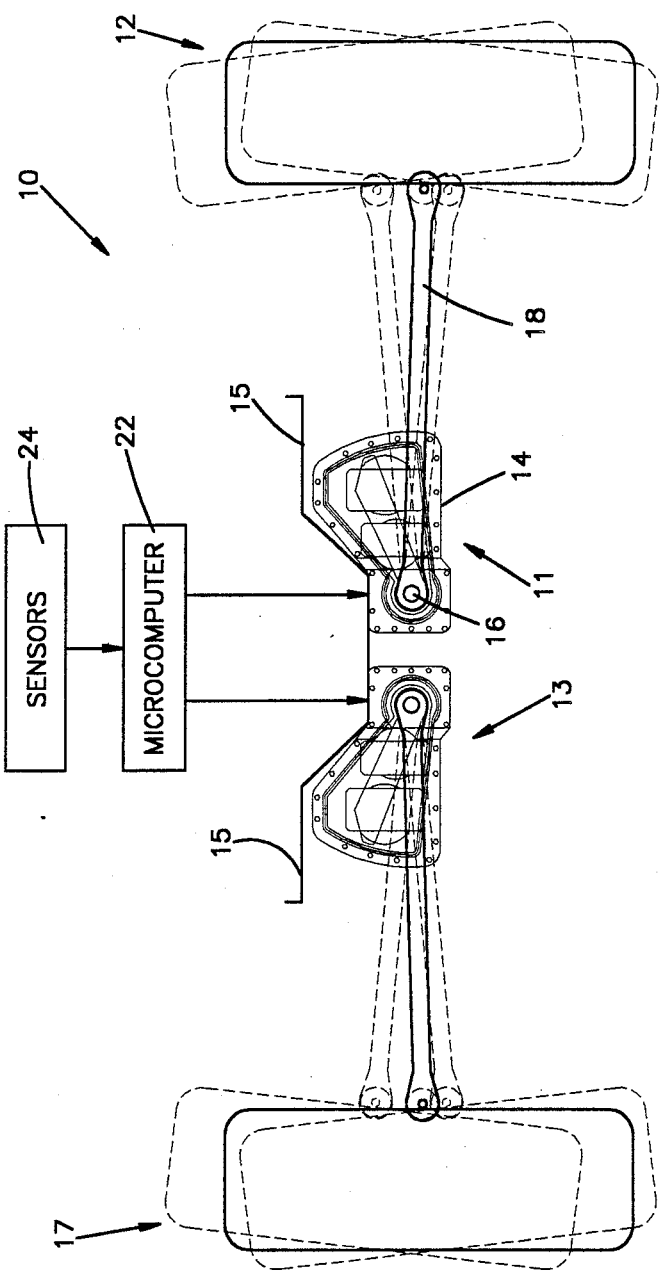
FIG. 1 is a schematic diagram of a part of a vehicle suspension system incorporating a rotary shock absorber constructed in accordance with the present invention.
Figure 2:
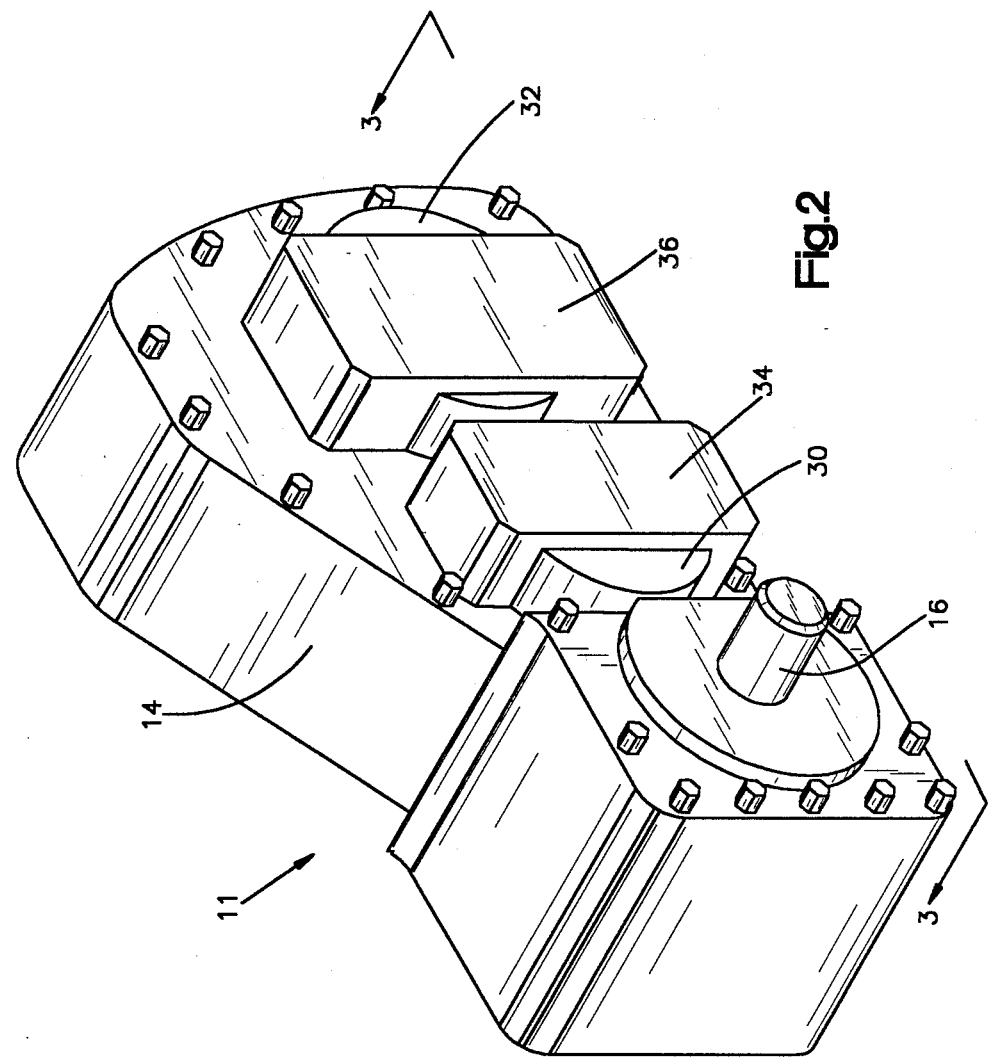
FIG. 2 is a perspective view of the rotary shock absorber shown in FIG. 1.
Figure 3:
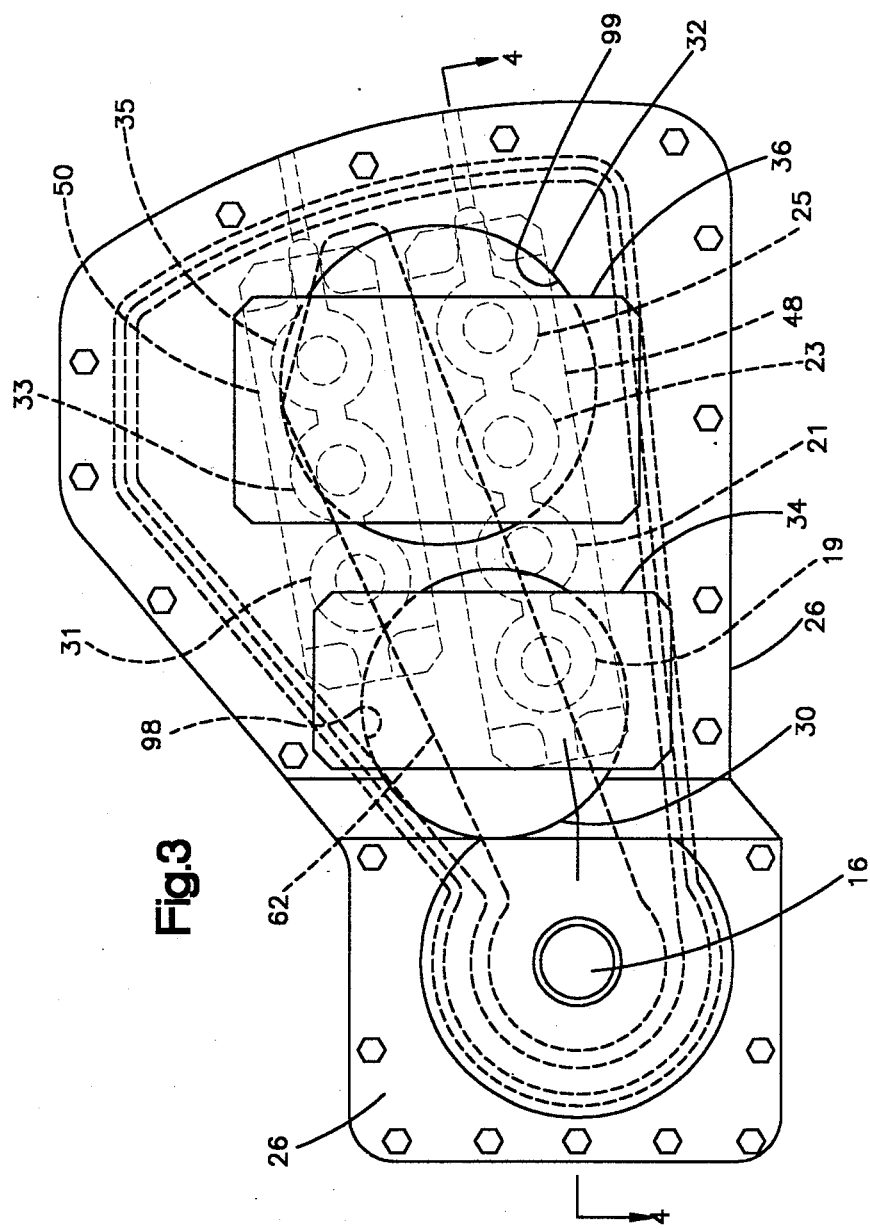
FIG. 3 is a view taken approximately along the line 3—3 of FIG. 2.

The present invention relates to an apparatus for damping relative movement between parts. The specific construction and use of the apparatus may vary. As an example, the present invention is illustrated in FIG. 1 as embodied in a vehicle suspension system 10. As shown in FIG. 1, two rotary shock absorbers 11, 13 are provided for damping relative movement between a frame part 15 of the vehicle and two wheel assemblies 12, 17 of the vehicle, respectively. Although the two rotary shock absorbers 11, 13 are shown in FIG. 1, only the rotary shock absorber 11 will be described. The structure and operation of the rotary shock absorber 13 are the same as the structure and operation of the rotary shock absorber 11.

The rotary shock absorber 11 is connected between the frame part 15 of the vehicle and the wheel assembly 12 of the vehicle. The shock absorber 11 includes a housing 14 connected to the frame part 15 of the vehicle. A rotatable shaft 16 having a longitudinal central axis is supported by the housing 14 and extends in the direction of forward movement of the vehicle. A suspension arm 18 is connected between the wheel assembly 12 and one axial end of the shaft 16. Another suspension arm 20 (shown only in FIG. 4) is connected between the wheel assembly 12 and the axially opposite end of the shaft 16 and lies parallel with the suspension arm 18.

As shown in FIG. 1, the suspension arm 18 is in its normal condition. When the wheel assembly 12 moves vertically up relative to the frame part 15, the suspension arm 18 moves vertically up to a position such as shown by the upper dotted lines in FIG. 1. The wheel assembly 12 moves vertically up when, for example, the wheel assembly 12 encounters an object like a rock in the road. Likewise, when the wheel assembly 12 moves vertically down relative to the frame part 15, the suspension arm 18 moves vertically down to a position such as shown by the lower dotted lines in FIG. 1. The wheel assembly 12 moves vertically down when, for example, the wheel encounters an opening like a chuckhole in the road. As the wheel assembly 12 of the vehicle moves vertically relative to the frame part 15 of the vehicle, the shaft 16 rotates about its longitudinal central axis relative to the housing 14. The direction of rotation of the shaft 16 depends upon the direction of vertical movement of the wheel assembly 12 relative to the frame part 15.

Figure 4:
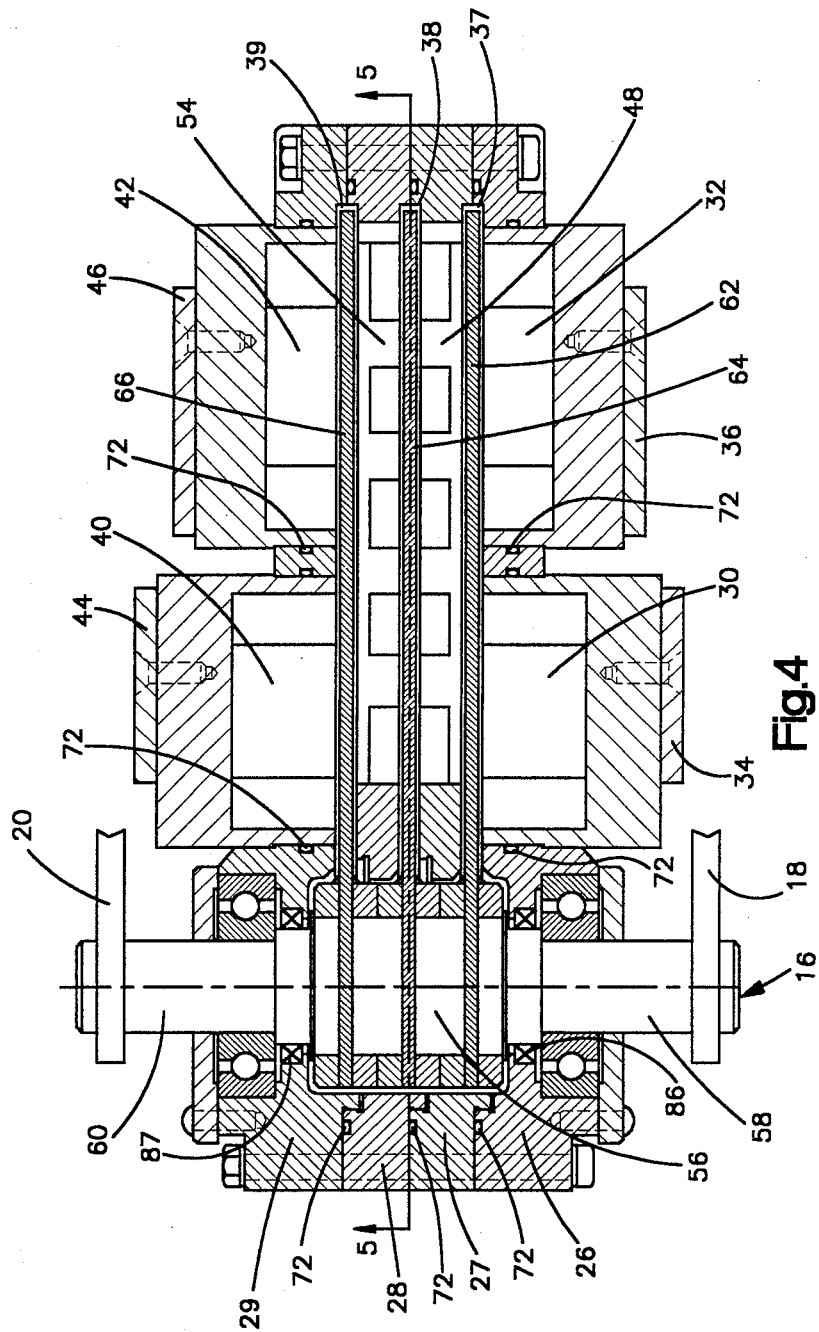
FIG. 4 is a sectional view taken approximately along the line 4—4 of FIG. 3.
Figure 5:
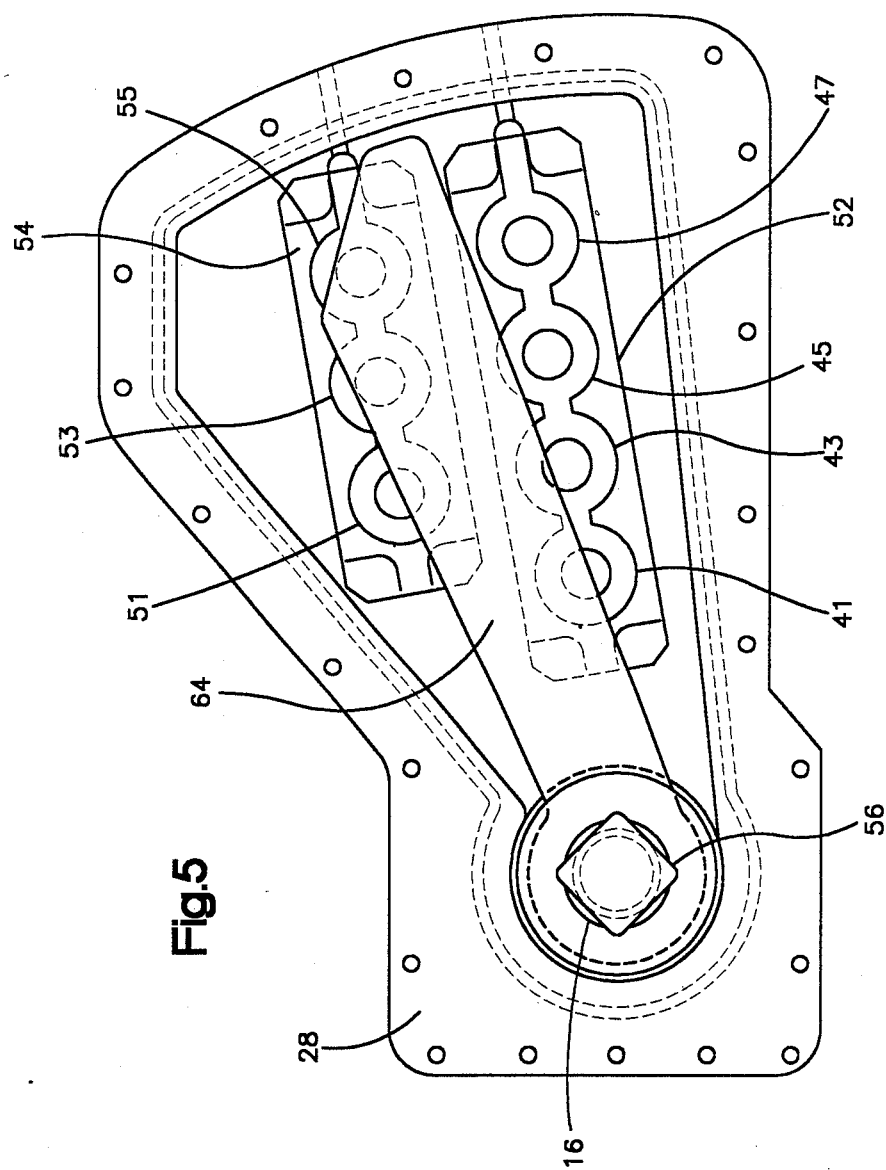
FIG. 5 is a sectional view taken approximately along the line 5—5 of FIG. 4.

Referring to FIGS. 2-5, the specific construction of the shock absorber 11 will become apparent. The housing 14 (FIG. 2) includes four housing sectors 26, 27, 28, 29 (FIG. 4). Although only four housing sectors are shown, it is understood that a different number of housing sectors could be used. The housing sectors 26, 27, 28, 29 are located in a side-by-side relationship. The housing sectors 26, 27, 28, 29 define three fluid chambers 37, 38, 39 within the housing 14. Although three fluid chambers are defined, it should be understood that the number of fluid chambers may be varied by varying the number of housing sectors. Each of the three fluid chambers 37, 38, 39 has a magnetizable fluid disposed therein.

The shaft 16 (FIGS. 4 and 5) has a square-shaped central portion 56 with rounded corners and has two axially opposite end portions 58, 60. Each of the end portions 58, 60 of the shaft 16 has a circular cross-section. Three movable members 62, 64, 66 are connected with the square-shaped central portion 56 of the shaft 16 and extend radially of the shaft 16. Each of the movable members 62, 64, 66 has the shape of a rotor blade. The number of rotor blades corresponds to the number of fluid chambers. Each of the three rotor blades 62, 64, 66 extends into an associated one of the fluid chambers 37, 38, 39 and is angularly movable with the shaft 16 relative to the housing 14. The resistance to shear of the fluid in each of the fluid chambers 37, 38, 39 damps movement of each of the rotor blades 62, 64, 66 relative to the housing 14.

Figure 6:
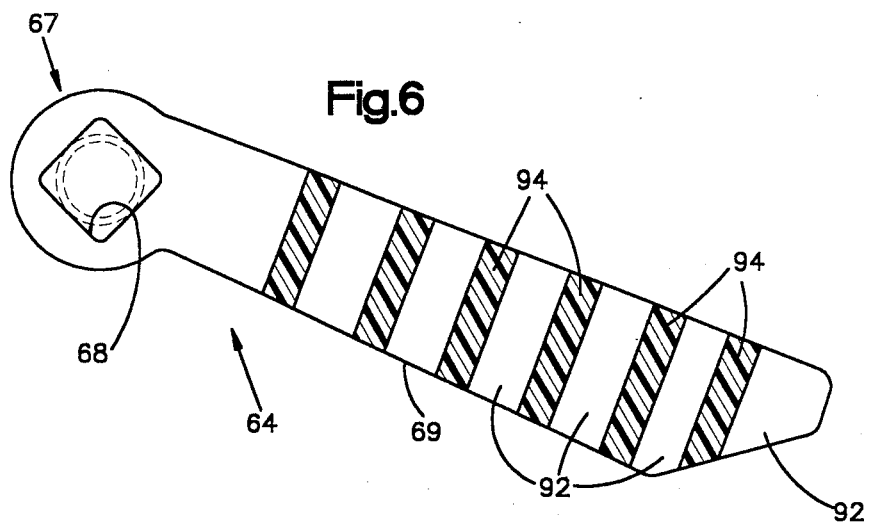
FIG. 6 is a detailed view of a blade used in the rotary shock absorber of FIGS. 2-5.

Each of the rotor blades 62, 64, 66 is identical in construction. For simplicity, only the rotor blade 64 (FIGS. 5 and 6) is described in detail. One end 67 of the rotor blade 64 has a square-shaped opening 68 which is complementary to the square shape of the central portion 56 of the shaft 16. The rotor blade 64 has a blade portion 69 which extends into the fluid chamber 38. When the shaft 16 rotates about its longitudinal central axis, the one end 67 of the rotor blade 64 rotates with the shaft 16 and the blade portion 69 of the rotor blade 64 angularly moves about the longitudinal central axis of the shaft 16 and through the fluid in the fluid chamber 38.

The blade portion 69 includes a plurality of paramagnetic steel segments 92 disposed along the radial extent of the blade portion 69. The steel segments 92 are equidistantly spaced apart from one another. Interposed between the plurality of steel segments 92 is a plurality of nonmagnetic insulating segments 94 made of a nonmagnetic material, such as brass, aluminum, or epoxy. The size of each of the insulating segments 94 is relatively small, but is exaggerated in FIG. 6 for illustrative purposes. Each of the insulating segments 94 is connected with its adjacent steel segments by chemical bonding or by using a suitable adhesive.

As shown in FIG. 4, O-rings 72 are provided and selectively located to prevent leakage of fluid from the fluid chambers 37, 38, 39 of the housing 14. A shaft seal 86 is connected between the shaft 16 and the housing sector 26 to prevent fluid from leaking along the shaft 16 in the vicinity of the end portion 58 of the shaft 16. Another shaft seal 87 is connected between the shaft 16 and the housing sector 29 to prevent fluid from leaking along the shaft 16 in the vicinity of the end portion 60 of the shaft 16. The end portion 60 of the shaft 16 is sealed in the same manner that the end portion 58 of the shaft 16 is sealed. For simplicity, only the shaft seal 86 at the end portion 58 of the shaft 16 is described.

Figure 7:
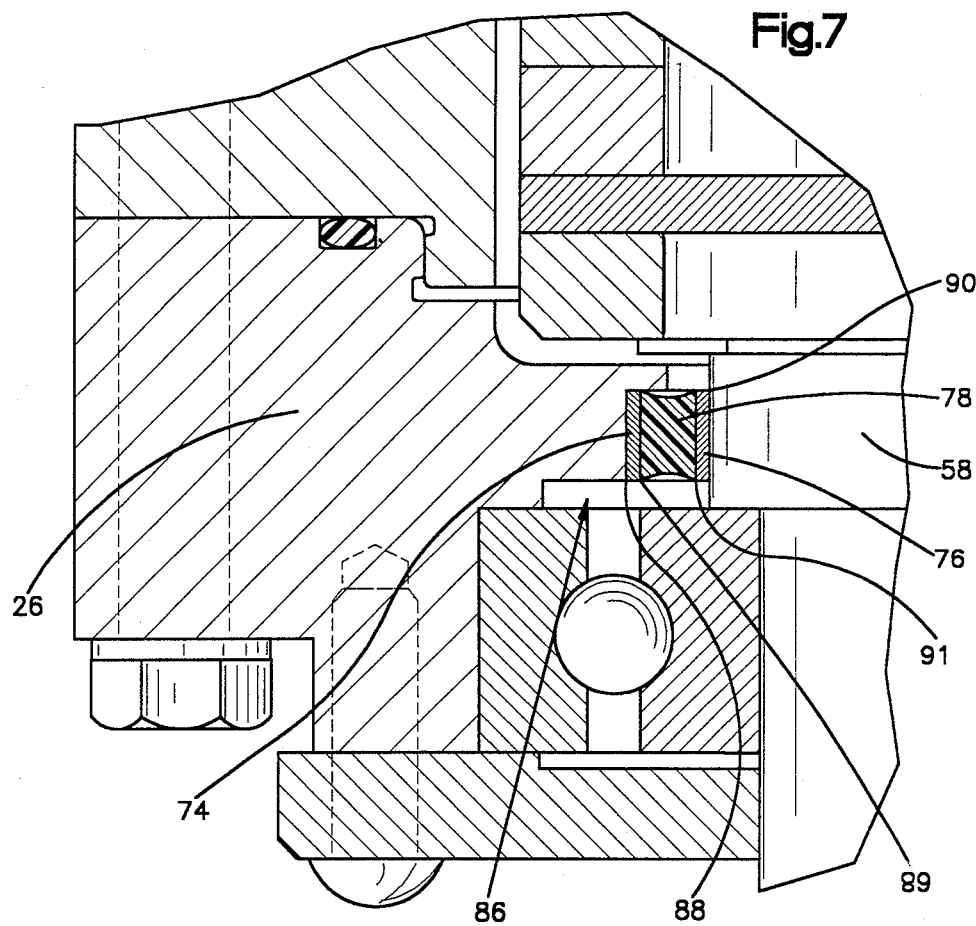
FIG. 7 is a detailed view of a portion of the rotary shock absorber of FIGS. 2-5 showing a seal in the rotary shock absorber.

The shaft seal 86 (FIG. 7) includes an annular-shaped elastomeric member 78 connected to an outer metal sleeve 74 and an inner metal sleeve 76. The outer sleeve 74 has an outer periphery 88 and an inner periphery 89. The inner sleeve 76 has an outer periphery 91 and an inner periphery 90. The outer periphery 88 of the outer sleeve 74 is press-fit into a portion of the housing sector 26. The inner periphery 90 of the inner sleeve 76 is press-fit on the end portion 58 of the shaft 16.

The elastomeric member 78 is stressed in response to rotational movement of the shaft 16. When the shaft 16 rotates about its longitudinal central axis, the inner sleeve 76 rotates relative to the outer sleeve 74. This relative movement between the inner sleeve 76 and the outer sleeve 74 results in the elastomeric member 78 being stressed. Although the elastomeric member 78 is stressed in response to rotational movement of the shaft 16, the sealing effect between the housing sector 26 and the end portion 58 of the shaft 16 remains fluid-tight.

Each of the housing sectors 26, 27, 28, 29 is constructed of a nonmagnetic material, preferably aluminum. The housing sector 26 (FIG. 3) includes two round-shaped holes 98, 99 in which two round-shaped electromagnetic coils 30, 32, respectively, are disposed. The coils 30, 32 (FIGS. 2 and 3) are mechanically fastened to the housing sector 26 by associated brackets 34, 36 and suitable fasteners. The coils 30, 32 alternatively could be chemically bonded to the housing sector 26. Two other round-shaped electromagnetic coils 40, 42 (FIG. 4) are mechanically fastened by associated brackets 44, 46 and suitable fasteners to the housing sector 29. Similarly, the coils 40, 42 alternatively could be chemically bonded to the housing sector 29. The nonmagnetic material of the housing 14 minimizes leakage of magnetic flux from the coils 30, 32, 40, 42.

Furthermore, two modular electromagnets 48, 50 (FIG. 3) are mechanically fastened with suitable fasteners to the housing sector 27. The modular electromagnet 48 has four individual coils 19, 21, 23, 25. The coils 19, 21, 23, 25 are aligned in a linear array and are encapsulated to form a modular unit. The construction of the modular electromagnet 50 is the same as the construction of the modular electromagnet 48, except that the modular electromagnet 50 has only three individual coils 31, 33, 35.

Two other modular electromagnets 52, 54 (FIG. 5) are similar to the modular electromagnets 48, 50, respectively. The modular electromagnets 52, 54 are mechanically fastened by suitable fasteners to the housing sector 28. The modular electromagnet 52 has four individual coils 41, 43, 45, 47. The modular electromagnet 54 has three individual coils 51, 53, 55. The structure and methods used to construct modular electromagnets are well known and, therefore, will not be described.

Figure 8:
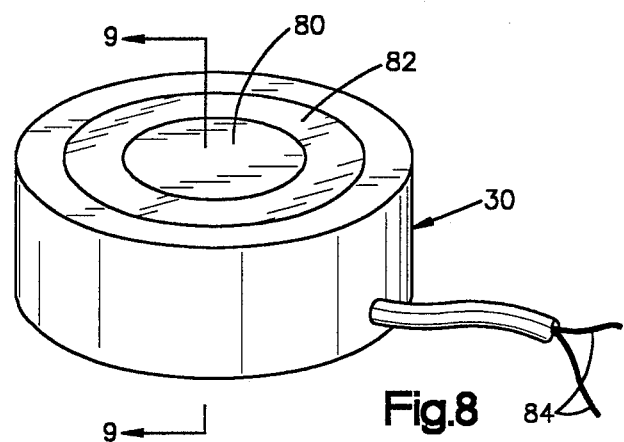
FIG. 8 illustrates an electromagnetic coil used in the rotary shock absorber of FIGS. 2-5.
Figure 9:
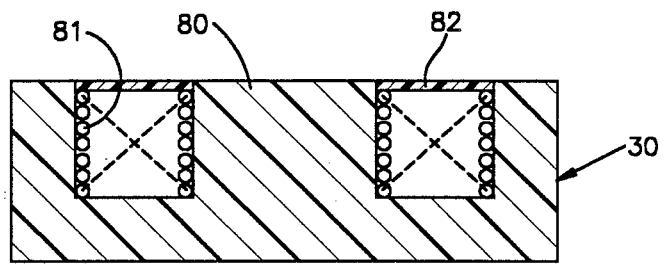
FIG. 9 is a sectional view taken approximately along the line 9—9 of FIG. 8.

Referring to FIGS. 8 and 9, the specific construction of the round-shaped electromagnetic coil 30 is shown. The construction of each of the other three round-shaped electromagnetic coils 32, 40, 42 is the same as the construction of the coil 30. For simplicity, only the coil 30 is described in detail. The coil 30 includes a soft iron core 80 around which electrical wire 81 is wound. The electrical wire 81 is covered with a suitable encapsulating material 82 such as epoxy, as is known. The core 80 has screw holes (not shown) for fastening the coil 30 to its respective housing sector 26. A pair of wire-ends 84 extends from the coil 30 for receiving an electrical signal.

The four round-shaped coils 30, 32, 40, 42 and the four modular electromagnets 48, 50, 52, 54 are mounted at predetermined locations on their respective housing sectors. The two coils 30, 40 are mounted and aligned with respect to each other so that the poles of the coil 30 face opposite poles of the coil 40. Similarly, the two coils 32, 42 are mounted and aligned with respect to each other so that the poles of the coil 32 face opposite poles of the coil 42. The two modular electromagnets 48, 52 are mounted and aligned with respect to each other so that the poles of the coils 19, 21, 23, 25 associated with the modular electromagnet 48 face opposite poles of the coils 41, 43, 45, 47 associated with the modular electromagnet 52, respectively. Similarly, the two modular electromagnets 50, 54 are mounted and aligned with respect to each other so that the poles of the coils 31, 33, 35 associated with the modular electromagnet 50 face opposite poles of the coils 51, 53, 55 associated with the modular electromagnet 54, respectively.

Figure 10:
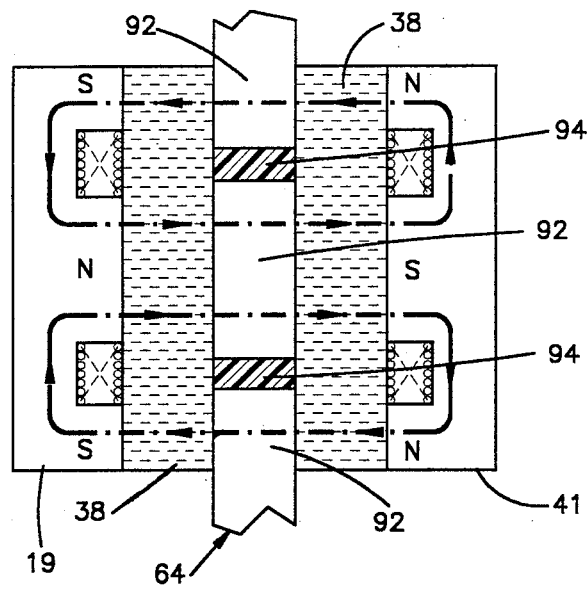
FIG. 10 is a detailed view of a portion of the rotary shock absorber of FIGS. 2-5 showing lines of magnetic flux passing through a blade in the rotary shock absorber.

The spatial relationships and the magnetic interaction between pairs of opposite-facing coils are similar. For simplicity, only the spatial relationship and the magnetic interaction between the coil 19 of the modular electromagnet 48 and the coil 41 of the modular electromagnet 52 are described. The spatial relationship and the magnetic interaction between the coils 19, 41 is illustrated in FIG. 10 which shows a portion of the rotor blade 64 extending into a portion of the fluid chamber 38. The coils 19, 41 are shown with the poles of the coil 19 facing opposite poles of the coil 41. Thus, the opposite-facing poles of the coils 19, 41 are separated by the rotor blade 64 and the fluid-filled gaps defined therebetween.

When the coils 19, 41 are energized, each coil generates its own magnetic field which interacts with the magnetic field of the other coil. The interaction between the magnetic fields is such that lines of magnetic flux are established between the two coils 19, 41 in the manner as shown in FIG. 10. The lines of magnetic flux established between the two coils 19, 41 pass through the fluid in the fluid chamber 38 and through some of the steel segments 92 of the rotor blade 64. These lines of magnetic flux act on the fluid in the fluid chamber 38 to vary the resistance to shear of the fluid.

The segmenting of the rotor blade 64 with the steel segments 92 and the insulating segments 94 provides an optimum path for the lines of magnetic flux to flow between the two coils 19, 41. If the insulating segments 94 were not interposed between the steel segments 92, then some of the lines of magnetic flux from the coil 19 would cancel with some of the lines of magnetic flux from the coil 41. This cancelling of lines of magnetic flux would occur in the vicinity of the insulating segments 94. However, by providing the insulating segments 94 between the steel segments 92, such cancelling of lines of magnetic flux is eliminated. Thus, by interposing the insulating segments 94 between the steel segments 92, the operation of the shock absorber 11 is made more efficient.

The spatial relationships and the magnetic interaction of other pairs of opposite-facing coils associated with the four modular electromagnets 48, 50, 52, 54 are similar to the spatial relationship and the magnetic interaction of the two coils 19, 41. The coils 21, 23, 25 of the modular electromagnet 48 interact with the coils 43, 45, 47 of the modular electromagnet 52, respectively. The coils 31, 33, 35 of the modular electromagnet 50 interact with the coils 51, 53, 55 of the modular electromagnet 54, respectively. The coil 30 interacts with the coil 40 and the coil 32 interacts with the coil 42. The lines of magnetic flux established between the two coils 30, 40 not only act on the fluid in the fluid chamber 38, but also act on the fluid in the other two fluid chambers 37, 39. Similarly, the lines of magnetic flux established between the two coils 32, 42 not only act on the fluid in the fluid chamber 38, but also act on the fluid in the other two fluid chambers 37, 39.

During operation of the shock absorber 11 in the vehicle suspension system 10 of FIG. 1, the wheel assembly 12 connected with the end portions 58, 60 of the shaft 16 moves vertically relative to the frame part 15 connected with the housing 14. When the wheel assembly 12 moves vertically relative to the frame part 15, the shaft 16 rotates about its longitudinal central axis relative to the housing 14. When the shaft 16 rotates about its longitudinal central axis relative to the housing 14, the three rotor blades 62, 64, 66 angularly move within their respective fluid chambers 37, 38, 39 relative to the housing 14. The movement of the rotor blades 64, 66, 68 is damped by the shear resistance of the fluid in the fluid chambers 37, 38, 39. Since the movement of each of the rotor blades 62, 64, 66 is damped, the vertical movement of the wheel assembly 12 relative to the frame part 15 is damped.

The resistance to shear of the fluid varies as a function of the voltages applied to the coils 30, 32, 40, 42 and to the coils 19, 21, 23, 25, 31, 33, 35, 41, 43, 45, 47, 51, 53, 55 associated with the four modular electromagnets 48, 50, 52, 54. The resistance to angular movement of the rotor blades 62, 64, 66 within their respective fluid chambers 37, 38, 39 varies as a function of the shear resistance of the fluid. The resistance to vertical movement of the wheel assembly 12 relative to the frame part 15 depends upon the resistance to angular movement of the rotor blades 62, 64, 66 within their respective fluid chambers 37, 38, 39. Thus, by varying the voltages applied to the coils 30, 32, 40, 42 and to the coils 19, 21, 23, 25, 31, 33, 35, 41, 43, 45, 47, 51, 53, 55 associated with the four modular electromagnets 48, 50, 52, 54, the resistance to vertical movement of the wheel assembly 12 relative to the frame part 15, and hence the damping rate of the shock absorber 11, is varied.

A microcomputer 22 is controllably connected with the shock absorber 11 to control the damping rate of the shock absorber 11. The microcomputer 22 monitors output signals from a number of remote sensors 24 and generates control output signals in accordance with preprogrammed procedures stored in an internal memory of the microcomputer 22. Microcomputers are readily available in the commercial market. Their internal structure and operation are well known in the art and, therefore, will not be described in detail herein.

The output signals from the remote sensors 24 may be indicative of road conditions, such as a chuckhole, a rock on the road, etc. to be encountered by the vehicle. These output signals may also include indications of vehicle acceleration, vehicle speed, or brake system pressure. In response to the output signals from the remote sensors 24, the microcomputer 22 generate the control output signals to control the voltages applied to the coils 30, 32, 40, 42 and to the coils 19, 21, 23, 25, 31, 33, 35, 41, 43, 45, 47, 51, 53, 55 associated with the four modular electromagnets 48, 50, 52, 54. As already mentioned hereinabove, the damping rate of the shock absorber 11 varies as a function of the voltages applied to the coils 30, 32, 40, 42 and to the coils 19, 21, 23, 25, 31, 33, 35, 41, 43, 45, 47, 51, 53, 55 associated with the four modular electromagnets 48, 50, 52, 54.

The rotary shock absorber 11 is capable of a range of controlled damping rates and is not limited to a fixed damping rate. Furthermore, the suspension arm 18 connected to the one end portion 58 of the shaft 16 acts as a suspension element as well as a connecting element between the frame part 15 and the wheel assembly 12. The suspension arm 20 connected at the end portion 60 of the shaft 16 also acts as a suspension element as well as a connecting element between the frame part 15 and the wheel assembly 12.

Although the shock absorber 11 has been described with a magnetizeable fluid in the three fluid chambers 37, 38, 39, it is contemplated that an electrorheological fluid responsive to an electric field may be used in place of the magnetizeable fluid. If an electrorheological fluid responsive to an electric field is used, then the rotor blades need not be constructed of a plurality of nonmagnetic segments interposed between a plurality of magnetic segments. This is because an electric field, and not a magnetic field, is acting on the electrorheological fluid.

Also, if an electrorheological fluid is used, the electromagnetic coils would not be needed and a number of energizeable electrodes would have to be provided within each of the fluid chambers. When the electrodes are energized, an electric field is generated and acts on the fluid in the respective fluid chambers. The resistance to shear of the fluid varies in response to the electric field acting on the fluid.

Figure 11:
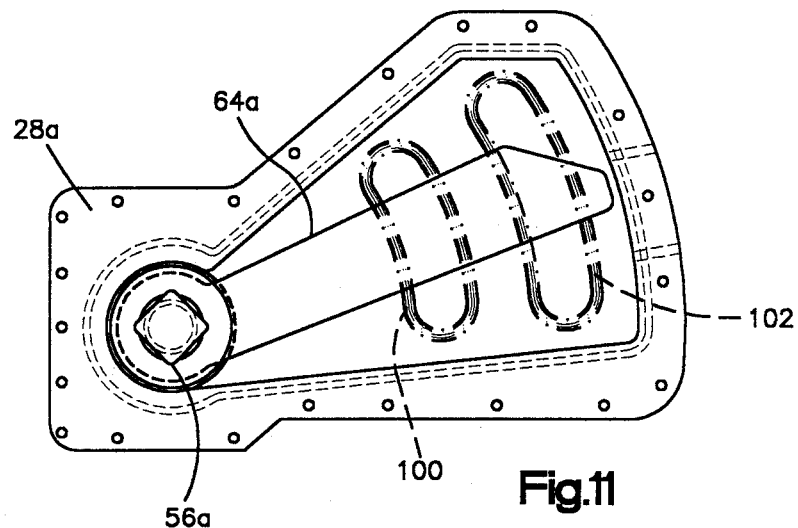
FIG. 11 is a view similar to FIG. 5 of another embodiment of the present invention.

Another embodiment of the present invention is shown in FIG. 11. Since the embodiment of the invention shown in FIG. 11 is generally similar to the embodiment of the invention shown in FIGS. 1-10, similar numerals will be utilized to designate similar components, the suffix letter "a" being associated with the components of FIG. 11 to avoid confusion.

The arrangement of components in the embodiment shown in FIG. 11 is the same as that shown in FIGS. 1-10, except that four arcuate-shaped electromagnetic coils are used in place of the four modular electromagnets 48, 50, 52, 54 in the embodiment shown in FIGS. 1-10. Only two of the four arcuate-shaped coils, designated as 100 and 102, are shown in FIG. 11. One of the two arcuate-shaped coils not shown is identical to the coil 100 and is mounted and aligned on its respective housing sector in opposite-facing relationship to the coil 100. The other one of the two arcuate-shaped coils not shown is identical to the coil 102 and is mounted and aligned on its respective housing sector in opposite-facing relationship to the coil 102.

Figure 12:
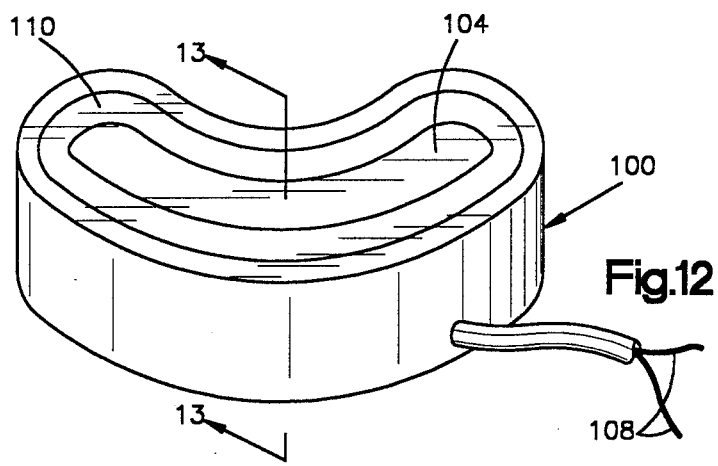
FIG. 12 illustrates an arcuate-shaped electromagnetic coil used in the rotary shock absorber of FIG. 11.
Figure 13:
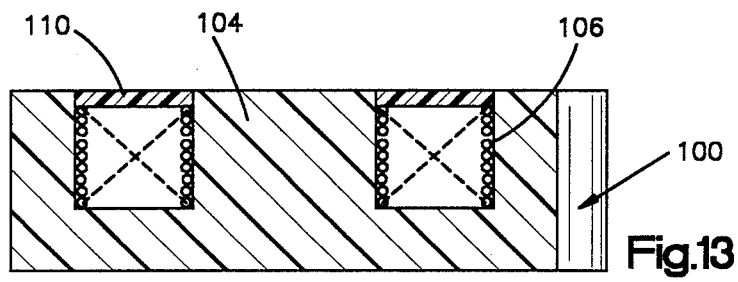
FIG. 13 is a sectional view taken approximately along the line 13—13 of FIG. 12.

The structure of each arcuate-shaped coil is similar. For simplicity, only the coil 100 is described in detail. As shown in FIGS. 12 and 13, the arcuate-shaped coil 100 includes an arcuate-shaped soft iron core 104 around which electrical wire 106 is wound. The electrical wire 106 is covered with a suitable encapsulating material 110. The arcuate-shaped core 104 has screw holes (not shown) for fastening the arcuate-shaped coil 100 to its respective housing sector 28. A pair of wire-ends 108 extends from the coil 100 for receiving an electrical signal. It is also conceivable that the coils 30a, 32a mounted on the housing sector 26a and the coils 40a, 42a mounted on the housing sector 29a could be arcuate-shaped. The spatial relationships between pairs of opposite-facing arcuate-shaped coils and the magnetic interaction therebetween are the same as that previously described for the embodiment of the present invention in FIGS. 1-10.

This invention has been described above with reference to preferred embodiments. Modifications and alterations may become apparent to one skilled in the art upon reading and understanding the specification. It is intended to include all such modifications and alterations within the scope of the appended claims.

Having described preferred embodiments of the invention, I claim:

1. A rotary shock absorber for use in a vehicle comprising:
   a housing connectable with the vehicle frame and defining at least one chamber for a field-responsive fluid;
   means for applying an energy field to the fluid in said chamber to vary the resistance to shear of the fluid as a function of the energy field acting thereon;
   a shaft supported for rotation about its longitudinal central axis relative to said housing and extending in the direction of movement of the vehicle;
   a rotor blade disposed in said chamber and connected with said shaft and extending radially of said shaft, the movement of said rotor blade in said chamber being resisted by the fluid; and
   at least one arm having one end connectable to said shaft and extending radially of said shaft, the other end of said arm being connectable with a vehicle wheel for vertical movement with the vehicle wheel, said shaft rotating about its longitudinal central axis relative to said housing and said rotor blade moving in said chamber as the vehicle wheel moves relative to the vehicle frame, the resistance to movement of the arm varying as a function of the resistance to movement of said rotor blade in said chamber.

2. The rotary shock absorber of claim 1 wherein said housing includes at least two housing sectors arranged in a side-by-side relationship to define said chamber between said housing sectors.

3. The rotary shock absorber of claim 1 wherein said rotor blade includes an end portion connected with said shaft and a blade portion extending into said chamber, said blade portion having a plurality of magnetic segments disposed along the radial extent of said blade portion and having a plurality of nonmagnetic segments interposed between said plurality of magnetic segments.

4. The rotary shock absorber of claim 1 wherein said means for applying an energy field to the fluid includes an energizeable electromagnetic coil for, when energized, providing a magnetic field having lines of magnetic flux passing through and acting on the fluid in said chamber.

5. The rotary shock absorber of claim 4 wherein said electromagnetic coil has an arcuate-shaped magnetic core on which electrical wire is wound.

6. A rotary shock absorber for damping relative movement between parts, said rotary shock absorber comprising:
   a housing connectable to one of the parts and defining at least one chamber for a field-responsive fluid;
   a shaft having its axially opposite ends connectable to another one of the parts and being supported for rotation about its longitudinal central axis relative to said housing;
   a rotor blade disposed in said chamber and connected with said shaft and extending radially of said shaft, the movement of said rotor blade in said chamber being resisted by the fluid; and
   at least one energizeable, arcuate-shaped electromagnetic coil connected with said housing for, when energized, applying an energy field to the field-responsive fluid in said chamber to vary the resistance to shear of the fluid as a function of the energy field acting thereon, said shaft rotating about its longitudinal central axis relative to said housing and said rotor blade moving in said chamber as the parts move relative to each other, the resistance to relative movement of the parts varying as a function of the resistance to movement of said rotor blade in said chamber.

7. The rotary shock absorber of claim 6 wherein said housing includes at least two housing sectors arranged in a side-by-side relationship to define said chamber between said housing sectors.

8. The rotary shock absorber of claim 6 wherein said rotor blade includes an end portion connected with said shaft and a blade portion extending into said chamber, said blade portion having a plurality of magnetic segments disposed along the radial extent of said blade portion and having a plurality of nonmagnetic segments interposed between said plurality of magnetic segments.

9. An apparatus for damping relative movement between parts, said apparatus comprising:
   a housing connectable to one of the parts and defining at least one chamber for a field-responsive fluid;
   a shaft having its axially opposite ends connectable with another one of the parts and being supported for rotation about its longitudinal central axis relative to said housing;
   a rotor blade disposed in said chamber and connected with said shaft and extending radially of said shaft, the movement of said rotor blade in said chamber being resisted by the fluid; and
   yieldable means connected between said housing and axially opposite end portions of said shaft for providing a fluid-tight seal between said housing and said axially opposite end portions of said shaft to prevent leakage of the fluid from said chamber, said yieldable means including an outer sleeve press-fit into said housing, an inner sleeve press-fit on an end portion of said shaft, and an elastomeric member which is connected between said inner and outer sleeves and which stretches upon rotation of said shaft relative to said housing.

10. The apparatus of claim 9 further including means for applying an energy field to the fluid in said chamber to vary the resistance to shear of the fluid as a function of the energy field acting thereon, said shaft rotating about its longitudinal central axis relative to said housing and said rotor blade moving in said chamber as the parts move relative to each other, the resistance to relative movement of the parts varying as a function of the resistance to movement of said rotor blade in said chamber.

11. The apparatus of claim 9 wherein said housing includes at least two housing sectors arranged in a side-by-side relationship to define said chamber between said housing sectors.

12. An apparatus for damping relative movement between parts, said apparatus comprising:
   a housing connectable to one of the parts and defining at least one chamber for a field-responsive fluid;

a shaft having its axially opposite ends connectable with another one of the parts and being supported for rotation about its longitudinal central axis relative to said housing;

a rotor blade disposed in said chamber and connected with said shaft and extending radially of said shaft, the movement of said rotor blade in said chamber being resisted by the fluid, said rotor blade including an end portion connected with said shaft and a blade portion extending into said chamber, said blade portion having a plurality of magnetic segments disposed along the radial extent of said blade portion and having a plurality of nonmagnetic segments interposed between said plurality of magnetic segments; and yieldable means connected between said housing and axially opposite end portions of said shaft for providing a fluid-tight seal between said housing and said axially opposite end portions of said shaft to prevent leakage of the fluid from said chamber, said yieldable means including an outer sleeve press-fit into said housing, an inner sleeve press-fit on an end portion of said shaft, and an elastomeric member connected between said inner and outer sleeves.

13. The apparatus of claim 10 wherein said means for applying an energy field to the fluid includes an energizeable electromagnetic coil for, when energized, providing a magnetic field having lines of magnetic flux passing through and acting on the fluid in said chamber.

14. The apparatus of claim 13 wherein said electromagnetic coil has an arcuate-shaped magnetic core on which electrical wire is wound.

* * * * *